United States Patent [19]
Scaringe et al.

[11] Patent Number: 5,117,809
[45] Date of Patent: Jun. 2, 1992

[54] FLAMELESS HEATER PRODUCT FOR READY-TO-EAT MEALS AND PROCESS FOR MAKING SAME

[75] Inventors: Robert P. Scaringe, Rockledge; Clyde F. Parrish, Melbourne, both of Fla.

[73] Assignee: Mainstream Engineering Corporation, Rockledge, Fla.

[21] Appl. No.: 663,671

[22] Filed: Mar. 4, 1991

[51] Int. Cl.$^5$ .................................................. F24J 1/00
[52] U.S. Cl. ...................................................... 126/263
[58] Field of Search ............................................ 126/263

[56] References Cited

U.S. PATENT DOCUMENTS

| 2,935,983 | 5/1960 | Reik | 126/263 |
| 3,550,578 | 12/1970 | Fearon et al. | 126/263 |
| 3,942,511 | 3/1976 | Black et al. | 126/263 |
| 4,366,804 | 1/1983 | Abe | 126/263 |
| 4,516,564 | 5/1985 | Koiso et al. | 126/263 |
| 4,522,190 | 6/1985 | Kuhn et al. | 126/263 |
| 4,756,299 | 7/1988 | Podella | 126/263 |

Primary Examiner—Carroll B. Dority
Attorney, Agent, or Firm—Evenson, Wands, Edwards, Lenahan & McKeown

[57] ABSTRACT

A water-activated, exothermic-chemical heater for packaging in a plastic heating bag is produced by methods which allow the heater material to be loosely placed in the heater while retaining the heating material uniformly distributed over the heater by cup-shaped or through cavities in a rigid member covered by a porous, wettable material on at least one side. Alternatively, the heater material is loosed placed in small bags made in a flexible porous material, with the necessary system rigidity provided by a cardboard or polymeric outer cover on one or both sides of the flexible porous material. Food-grade acid anhydride or free acid can be incorporated into the heater material to maintain proper pH. Flammability control can be achieved by blending a known fire retardant into the heater pad materials.

34 Claims, 4 Drawing Sheets

HEATER MATERIAL PACKAGED BETWEEN POROUS HEAT SEALABLE MATERIAL - SUCH AS NONWOVEN POLYPROPYLENE

POROUS HEAT-SOLUABLE COVER MATERIAL (MINIMUM - WETTABLE ON ONE SIDE)

HEATER MIXTURE

THERMAL OR ADHESIVE BONDS

CARDBOARD OR POLYMERIC PROTECTIVE COVER

FLAMELESS HEATER PRODUCT FOR READY-TO-EAT MEALS AND PROCESS FOR MAKING SAME

BACKGROUND AND SUMMARY OF THE INVENTION

The present invention relates to an improved Meal-Ready-to-Eat (MRE) Flameless heater product and process for the manufacture thereof, and, more particularly, to an MRE-Flameless product and process which uses a novel heater pad composition to allow lower cost mass production while yielding a superior product.

The manufacture of a MRE-Flameless heater used by, for example, the military is set forth in Military Specification MIL-R-44398A (Jul. 10, 1990). The method of construction as detailed in the military specification is impractical for mass production which, for military use alone, is on the order of about 24 million heaters per month.

The Mil-Spec calls for preparation of an Mg—Fe powder alloy by ball milling of the magnesium and food-grade iron powders and then blending the powdered alloy with an electrolyte, respectively, to form a supercorroding blend. The electrolyte (e.g., salt) is activated by the addition of water, which initiates rapid corrosion of the magnesium particles within the matrix. A surfactant is used to assure that the water wets the alloy surfaces.

In the known heater construction, the supercorroding blend is mixed with plastic powders, such as high density polyethylene powders, and poured into molds. The plastic powders comprise 50% of the mixture mass. The molds are then oven baked to allow the polyethylene material to partially melt and fuse or sinter the mixture together. For military applications, each heater pad has approximate dimensions of 3½ by 4½ by ⅛ inches, and contains 20±2 grams of combined heater material and polyethylene filler material (50% by mass mix of each). After sintering, the porous but somewhat rigid material is then packaged into the heater pad covering. The heat pad is then covered with a paperboard cover with dimensions of 5½ by 4½ inches, as described in the above-mentioned MIL-R-44398A.

The known method of manufacturing relies on oven sintering for heater pad strength and assembly. This sintering, or partial melting, of the polyethylene material bonds the Mg—Fe particles into a porous structure. There are, however, disadvantages with this approach. In particular, the sintering effectively coats many of the Mg—Fe alloy surfaces thereby rendering them inactive for corrosion and subsequent heat generation. The bottom-side of the sintered structure sinters more completely than the top-side, with the result that this over-sintering causes a polyethylene skin to cover the entire side and reduce the porosity. Slight variations in sintering temperature significantly affect the amount of alloy which is covered by polymeric material and severely affects the total heat energy available. Thus, there is a substantial deviation in the finished product's heater capacity, and product uniformity is a problem. Finally, the sintered material is prone to flaking-off of many small Mg—Fe particles; these particles pass easily through the 0.25-inch diameter holes on the heater pad cover resulting in a less visually attractive product.

A basic problem with present heater pads is the method for packaging them, which method does not lend itself to rapid mass production. It is, therefore, an object of the present invention to provide an alternative packaging method to hold the loose heater materials in place and a product with a specific heater mixture for production of the necessary heat, control of the heating rate and suppression of the flammability of the magnesium alloy, which method does lend itself to rapid mass production.

The foregoing object has been achieved by a unique embodiments of a heater pad construction and currently three associated methods to package this heater pad. Although all three methods appear to perform substantially equivalently, any differences among them involve trade-offs such as, lower cost of tooling or more rapid production capability. Thus, greater options have now been provided than were heretofore available.

The heater pad construction according to the present invention includes a supercorroding Mg—Fe alloy powder, flame-retardant polymer and an electrolyte together with flow and wetting agents dispersed throughout a porous matrix formed from packaging the mixture between polymeric material or cellulose material.

The Mg—Fe alloy is prepared in a known manner by ball milling Mg5Atomic % Fe and then blending the resulting powdered alloy with 3% NaCl (salt), a surfactant (e.g. Triton X102), and optionally, a food-grade acid anhydride or free acid to maintain the proper pH. Food-grade acid can also be applied to the outside of the MRE heater pad, the inside of the outer pouch, or blended with the other ingredients. Flammability control can be achieved by blending a fire retardant into the heater pad materials.

The acid controls the acidity to a value between 4 and 7 pH units. This control is necessary because the rate of reaction of magnesium with water can become too vigorous at low pH and too slow at high pH values. An acid anhydride, such as benzoic anhydride, controls the pH by controlling the rate of hydrolysis of the anhydride to the acid. The acid when formed ionizes in water and lowers the pH. Many organic acids ionize to a limited extent and typically produce solutions with pH values in the 3 to 6 pH range. Thus, control of the formation of the acid by the hydrolysis reaction provides unique control of the heating rate of the MRE pad. The products of the chemical reaction are heat, magnesium hydroxide, and gaseous hydrogen.

Sodium chloride is added to the heater pad mixture at a 3% (0.6 gm) level to provide the needed electrolyte to help cause the water to react with the supercorroding alloy. Magnesium powder is a flammable solid, but when polyethylene treated with known flame retardants is mixed with the powder, it suppresses the flame propagation. A flame suppressant such as a polymer that contains a flame retardant is added to the other ingredients used in the heater pad of the present invention.

In the heater pad described in greater detail below, a supercorroding alloy blend (heater pad mixture) is packaged loose into a heater pad cover or rigid member which provides the strength and rigidity to hold the particles in place without sintering. The heater pad cover has, by way of example only, approximately dimensions of 5½ by 4½ by 3/16 inches, and shall contain sufficient heater material mixture to meet the MIL-R-44398A specification. The present invention avoids the use of sintered polymeric filler material to hold the alloy in place. Rather, the present invention utilizes a package to restrain the material and hold the latter uniformly within the desired surface area.

According to one packaging method in accordance with the present invention, the heater pad covering is composed of a rigid molded polymeric back-cover (e.g. polystyrene, polypropylene or polyethylene) molded into sub-packets to hold the heater material. The heater material will be evenly distributed within the sub-packets using an auger filler or some other dispensing mechanism. The top of the heater material will be covered with a flexible, porous cover such as nonwoven polypropylene, melt-blown or spun-blown polypropylene, cellulose-fiber material, tea paper, nonwoven polyethylene, and the like. The cover material is treated with a food-grade surfactant, such as Triton X102, to allow water to easily wet and penetrate the material.

This top cover is thermally or adhesively bonded at each of the contact edges with the bottom rigid cover. One embodiment of a heater pad back-cover is divided into nine sub-packets. Another embodiment of the heater pad is divided into six sub-packets. The more sub-packets, the less material and smaller segments for settling problems The number of sub-packets is, however, practically determined by the quantity of material which can be metered into each sub-packet and the speed associated with this filling operation.

A molded polymeric rigid-back-cover and a porous non-woven polypropylene-web front-cover contains the porous matrix of powders. The rigid-back-cover provides strength and rigidity to the assembly. For a military application, the rigid polymeric back-cover-material can be a light green.

To increase the rate of water migration into each of the sub-packets and to allow a non-wetted surface for escape of the generated hydrogen gas, small holes can be provided by punching or otherwise made through the back of the rigid molded back cover. These holes are smaller than the particle size contained in the sub-packets and yet are much larger than the average pore-size of the porous material on the front side. Because of the polymeric material being a natural non-wetting surface and of the relative large diameter of these holes, water bridging the holes, which could impede the exhaust of hydrogen from the heating reaction (hydrogen is a by product of this corrosion reaction), will not occur.

Instead of using a paperboard cover with nine holes (e.g. $\frac{1}{4}''$ in diameter) on each side, as in the current, commercially available heater pad, such that particles can fall out into the outer bag, the present invention uses a molded polymeric cover on the back side and a porous wettable cover on the top-side. In this way, a multitude of very small holes is dispersed throughout the top cover. This not only improves the mobility of the water and its ability to wet the Mg—Fe heater mixture, but also will not allow any particles to fall out of the heater pad cover into the outer bag.

According to another aspect of the present invention, the heater pad cover which contains the heater particle mixture is composed of a three layer sandwich. A bottom porous layer of wettable material, such as nonwoven polymeric or cellulose materials such as melt-blown polypropylene, spun-bond polypropylene, cellulose, tea paper, or some other porous wettable polymeric or cellulose material, is bonded to a center layer which has been die-cut to create cavities in the material. The center layer is created of either a cardboard, cellulose, or polymeric material which creates cavities for the heater material and also provide rigidity to the heater. The necessary volume (about 26 ml for the 22 gram military application) is achieved by a combination of the surface area cut-out and the thickness of the center material. The bottom porous layer is first bonded to the center layer to form pockets or cavities to hold the heater material. In the first method described above, the pockets are produced by the molding of the polymeric rigid back cover, whereas in this second method the pockets are formed by bonding a porous material to the bottom of a rigid material which has cut through cavities, for example, by passing the center material through a die-cutter to punch out the necessary hole pattern and then passing the punched-out material along with the bottom porous material through a set of hot rolling wheels to bond the bottom material to the center material.

MRE heater material is then dropped onto the continuously moving strip of pouches. The material is only dropped along the mid-section leaving the edges clear for bonding on the top layer, and the excess is scraped off with a doctor-blade arrangement. Alternately, an auger filler can be used. Finally, the top-layer of porous material is bonded onto the sandwich to complete the assembly. This top material can be either a treated woven or an untreated, woven or nonwoven polymeric or cellulose material which aids in removal of the gas produced. This heater sandwich is then sheared to the proper length.

In this second production method, both the top and bottom of the heater containment material will be a flexible, porous cover, for example, a melt-blown or spun-bond polymeric material or a cellulose fiber material. These covers are thermally or adhesively bonded at all contact edges with the center rigid skeleton. This process has the ability for much faster and more straightforward automation. Because the heater material is doctor-bladed off the surface, a larger number of smaller holes could be die-cut into the center rigid member or skeleton. Also, because the center rigid skeleton is not molded, a cardboard material can, if desired, be used instead of a polymeric material.

In a third production method and configuration of the heater pad, the heater powder is packaged between porous material in an arrangement of separate small bags which are connected together (by way of analogy, an array of tea bags attached together). These bags of heater material do not provide any rigidity and thus, must be packaged with an outer overwrap or cover of cardboard or polymeric material which provides the necessary system rigidity. The outer cover would be adhesively or thermally bonded to the inner porous bags at the bag seams. The outer cover can cover a single side of the porous bags or completely cover the inner bags on both sides. This outer bag is perforated with holes to allow the entrance of water and the escape of hydrogen. Because the outside protective cover, which provides the rigidity, is not molded, a cardboard material can be used, if desired, instead of a polymeric material.

A heater pad with protective polymeric or cardboard cover constructed from one of the methods described above, is sealed within a plastic bag for protecting the heater material from moisture and providing the container to hold the MRE when it is heated as it is now done in a known manner as described, for example, in above-mentioned MIL-R-44398A.

BRIEF DESCRIPTION OF THE DRAWINGS

These and other objects, features and advantages of the present invention will become more apparent from the following detailed description of several currently preferred embodiments of a heater pad and methods for the manufacture thereof when taken in conjunction with the accompanying drawings, wherein.

DETAILED DESCRIPTION OF THE DRAWINGS

Figure 1:
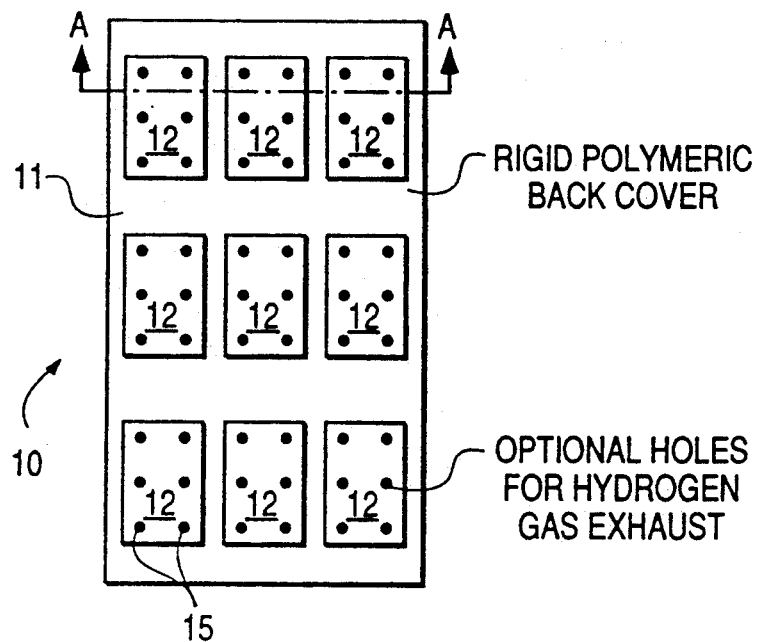
FIG. 1 is a plan view of a first embodiment of a heater-pad in accordance with the present invention utilizing a rigid back cover with nine pouches or cup-shaped cavities and a porous, wettable cover material.
Figure 1A:
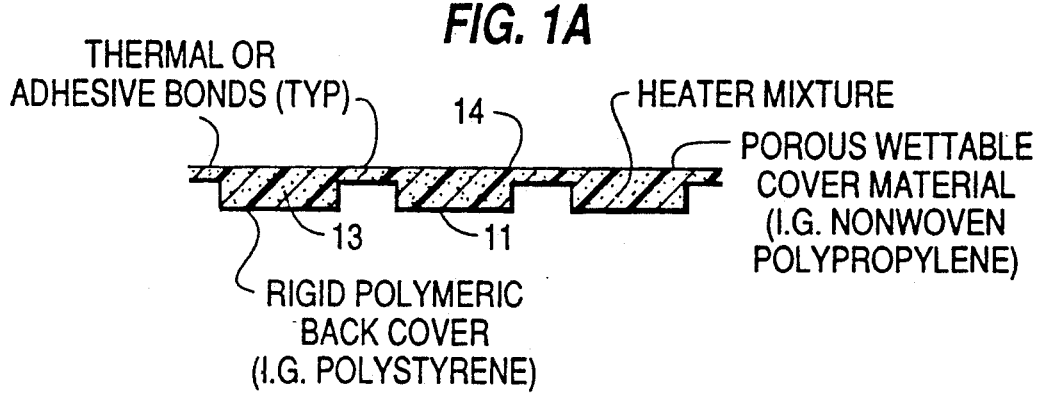
FIG. 1A is a sectional view along line A—A of FIG. 1.

The heater pad covering 10 shown in FIG. 1 is composed of a rigid molded polymeric back-cover 11 (e.g. polystyrene, polypropylene or polyethylene) molded into sub-packets 12 to hold the heater material 13. The heater material will be evenly distributed within the sub-packets 12 using an auger filler or some other dispensing mechanism. The top of the heater material 12 will be covered with a flexible, porous cover 14 such as nonwoven polypropylene, melt-blown or spun-blown polypropylene, cellulose-fiber material, tea paper, nonwoven polyethylene, and the like which is thermally o adhesively bonded at each of the contact edges with the cover or rigid member 11. The cover material 14 is treated with a food-grade surfactant, such as Triton X102, to allow water to easily wet and penetrate the material.

The heating material 13 is a supercorroding Mg—Fe alloy powder and an electrolyte together with flow and wetting agents dispersed throughout a porous matrix formed from packaging the mixture between polymeric material or cellulose material.

By way of example, the heater material 13 can consist of 13 gms of magnesium/iron alloy, 1 gram benzoic anhydride, 0.1 gm sodium chloride and 8.0 grams polyethylene powder treated with surfactant and flame retarder. The Mg—Fe alloy is prepared by ball milling Mg5Atomic % Fe and then blending the resulting powdered alloy with 3% NaCl (salt), a surfactant (e.g., Triton X102), and optionally, a food-grade acid anhydride or free acid to maintain the proper pH. Food-grade acid can also be applied to the outside of the MRE heater pad 10, the inside of the outer pouch, or blended with the other ingredients. Flammability control can be achieved by blending a fire retardant into the heater pad composition.

The acid controls the acidity to a value between 4 and 7 pH units. This control is necessary because the rate of reaction of magnesium with water can become too vigorous at low pH and the reaction rate is slow at high pH values. An acid anhydride, such as benzoic anhydride, controls the pH by controlling the rate of hydrolysis of the anhydride to the acid. The acid when formed ionizes in water and lowers the pH. Many organic acids ionize to a limited extent and typically produce solutions with pH values in the 3 to 6 pH range. Thus, control of the formation of the acid by the hydrolysis reaction provides unique control of the heating rate of the MRE pad. The products of the chemical reaction are heat magnesium hydroxide, and gaseous hydrogen.

Sodium chloride is added to the heater pad mixture at a 3% (0.6 gm) level to provide the needed electrolyte to help cause the water to react with the supercorroding alloy. Magnesium powder is a flammable solid, but when mixed with flame-retarded polyethylene, it suppresses the flame propagation. A flame suppressant such as a polymer that contains a flame retardant is added to the other ingredients used in the heater pad of the present invention.

Figure 2:
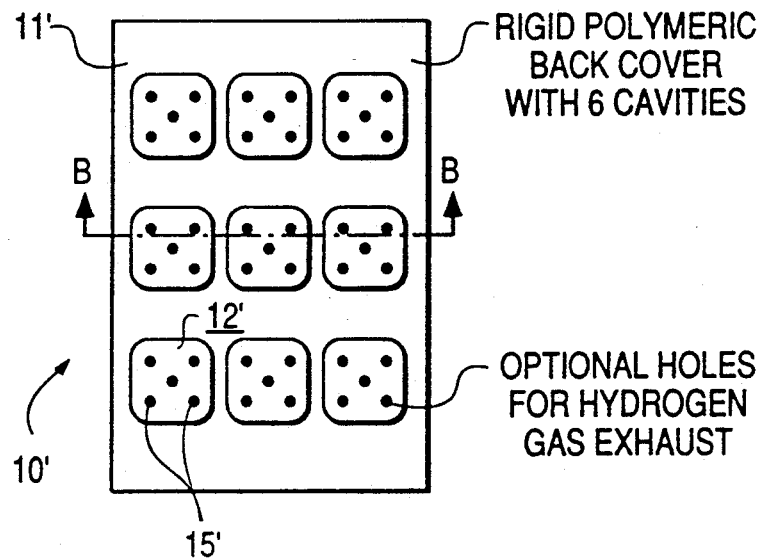
FIG. 2 is a plan view of a second embodiment of a heater pad similar to FIG. 1 having only six cavities.
Figure 2A:
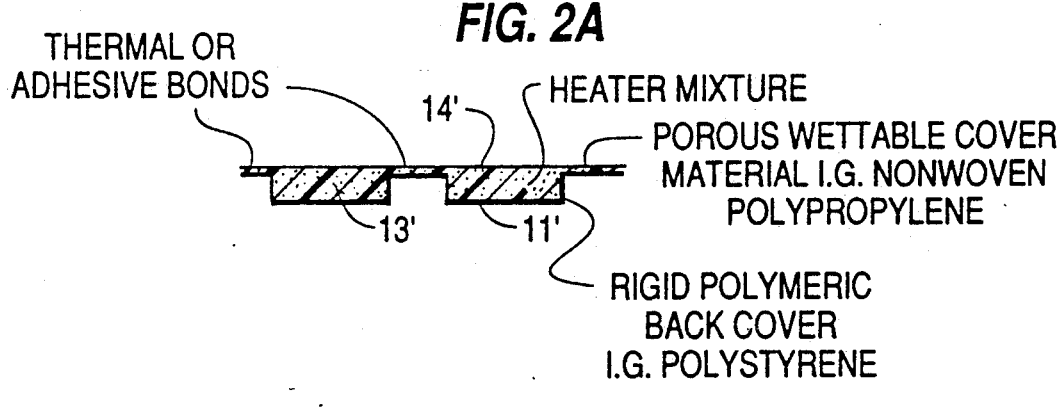
FIG. 2A is a sectional view along line B—B of FIG. 2.

The heater pad cover 10 shown in FIG. 1 and 10' shown in FIG. 2 has, by way of example only, approximately dimensions of 5½ by 4½ by 3/16 inches, and shall contain sufficient heater material mixture to meet the MIL-R-44398A specification. The cover avoids the use of sintered polymeric filler material to hold the alloy in place by utilizing the package itself to restrain the heating material 13 and hold the latter uniformly within the desired surface area.

To increase the rate of water migration into the sub-packets or pouches 12 and to allow a non-wetted surface for the hydrogen gas escape, small holes 15 are punched through the bottom of the sub-packets 12 in back of the rigid molded back cover 11. These holes 15 are smaller than the particle size of the heating material 13 contained in the sub-packets 12 and yet are much larger than the average pore-size of the porous material 14 on the front side of the pad 10. Because of the polymeric material 11 being a natural non-wetting surface and of the relative large diameter of these holes 15, water bridging the holes 15, which could otherwise impede the exhaust of hydrogen from the heating reaction (hydrogen is a by product of this corrosion reaction), will not occur.

Instead, therefore, of using a paperboard cover with nine ⅛" holes on each side, as in the current, commercially available heater pad, such that heating material particles can fall out into the outer bag, the present invention uses a rigid molded polymeric cover 11 on the back side and a porous wettable cover 14 on the topside as shown in FIG. 1. In this way, a multitude of very small holes is dispersed throughout the top cover. To improve the mobility of the water and its ability to wet the Mg—Fe heater mixture, but also to prevent any particles from falling out of the heater pad cover 10 into the outer bag (not shown).

The embodiment of FIG. 2 differs from FIG. 1 in that the latter has a cover 11 with nine sub-packets 12, whereas the former as a cover 11' with six, larger sub-packets 12'.

Figure 3:
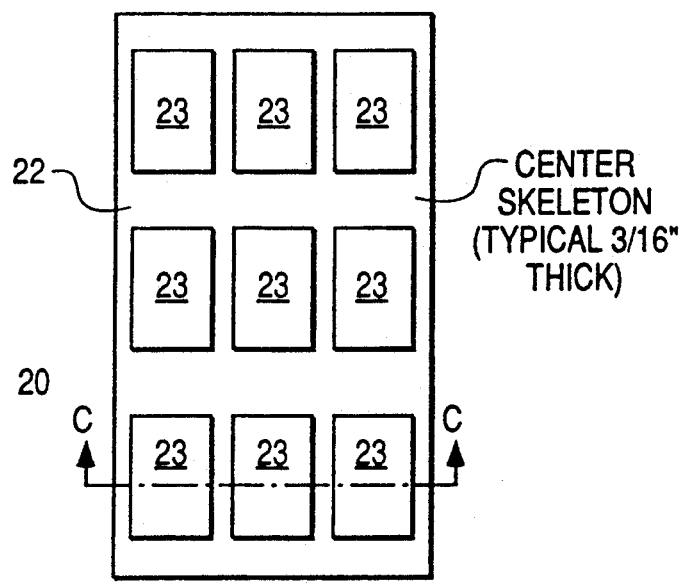
FIG. 3 is a plan view of a third embodiment of the heater pad of the present invention utilizing a center skeleton or rigid member with through-cavities with top and bottom cover material.
Figure 3A:
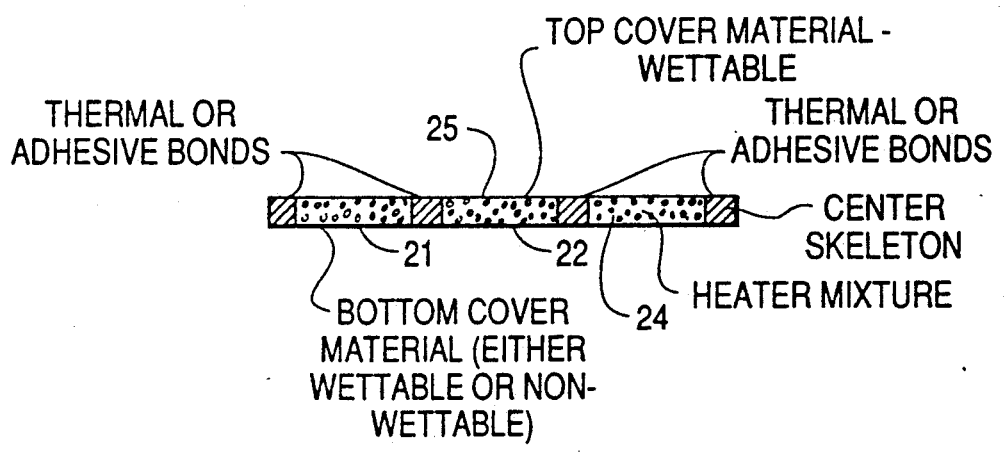
FIG. 3A is a sectional view along line C—C of FIG. 3.

According to another embodiment of the present invention as shown in FIG. 3, the heater pad cover 20 which contains the heater particle mixture is composed of a three layer sandwich. A bottom porous layer 21 of wettable material, such as nonwoven polymeric or cellulose materials such as melt-blown polypropylene, spun-bond polypropylene, cellulose, tea paper, or some other porous wettable polymeric or cellulose material, or unwettable material is bonded to a center layer 22 which has been die-cut to create through cavities 23. The center layer 22 is either a cardboard, cellulose, or polymeric material which creates the cavities 23 for the heater material 24 and also provide rigidity to the heater 20. The necessary volume (about 26 ml for the 22 gram military application) is achieved by a combination of the surface area cut-out and the thickness of the center material. The bottom porous layer 21 is first bonded to the center layer 22 to form the pockets or cavities 23 to hold the heater material 24. The heater material 24 is then dropped onto the continuously moving strip of pouches. The material is only dropped along the mid-section of the rigid center layer 22, leaving the edges clear for bonding on the top layer 25, and the excess material 24 is scraped off with a known doctor-blade arrangement. Alternatively, an auger filler of conventional construction can be used. Finally, the top-layer 25 of porous material is bonded onto the sandwich to complete the assembly. This top material can be either treated or untreated, woven or nonwoven wettable polymeric or cellulose material which aids in removal of the gas produced. This heater sandwich 20 is then sheared to the proper length.

In this second embodiment, both the top and bottom of the heater containment material will be a flexible, porous cover, for example, a melt-blown or spun-bond polymeric material or a cellulose fiber material. These covers are thermally or adhesively bonded at all contact edges with the center rigid skeleton. This embodiment allows the use of a process which has the ability for much faster and more straightforward automation. Because the heater material 24 is doctor-bladed off the surface, a larger number of smaller holes 23 can be die-cut into the center rigid member. Also, because the center rigid skeleton 22 is not molded, a cardboard material can be used instead of a polymeric material if desired.

Figure 4:
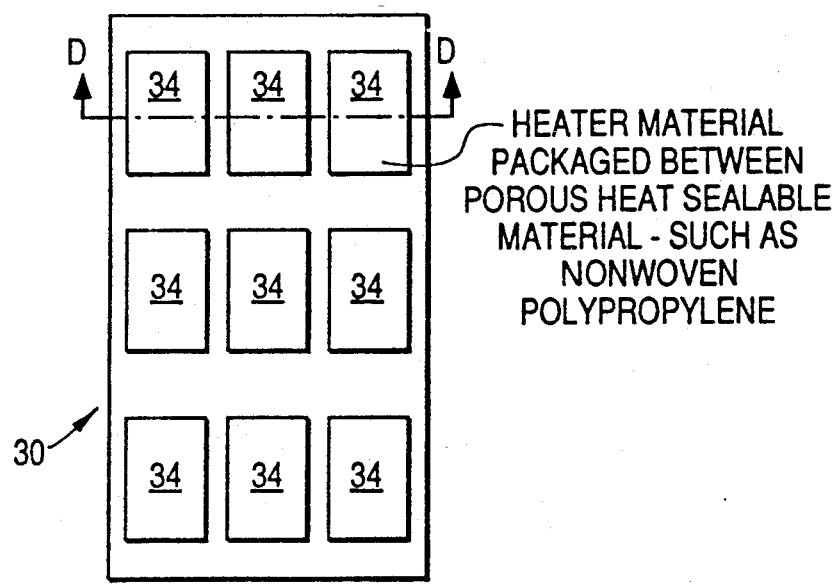
FIG. 4 is a plan view of a fourth embodiment of the heater pad of the present invention utilizing tea-bag-like packets containing heater material between a protective cover.
Figure 4A:
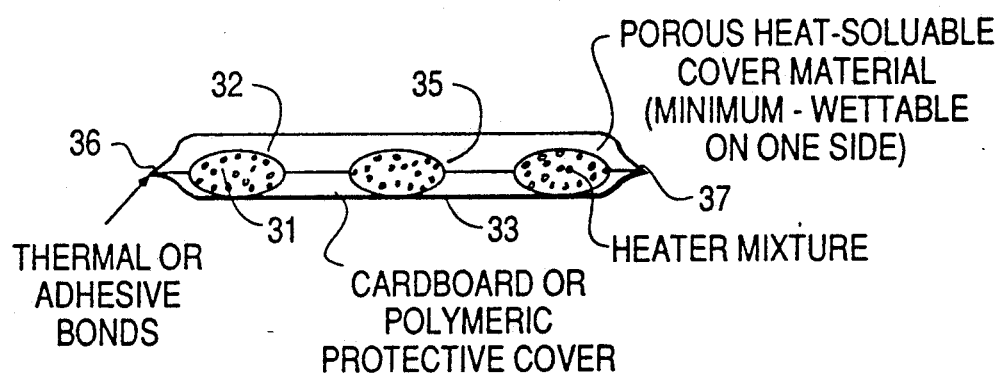
FIG. 4A is a sectional view along line D—D of FIG. 4.

In the embodiment of the heater pad 30 shown in FIG. 4, the heater powder 31 is packaged between porous material 32, 33 in an arrangement of separate small bags 34 which are connected together (by way of analogy, an array of tea bags attached together). These bags of heater material do not provide any rigidity and thus, must be packaged with an outer overwrap or cover 35 of cardboard or polymeric material which provides the necessary system rigidity. The outer cover 35 is adhesively or thermally bonded to the inner porous bags at the bag seams 36, 37. The outer cover 35 can cover a single side of the porous bags or completely cover the inner bags on both sides as shown in FIG. 4A. This outer cover 35 is also perforated with holes to allow the entrance of water and the escape of hydrogen. Because the outside protective cover, which provides the rigidity, is not molded, a cardboard material can be used, if desired, instead of a polymeric material.

The flameless heater for ready-to-eat meals described uses a known Mg—Fe corrosion reaction which is initiated by the addition of water into the bag containing the heater pad. Moisture can, however, permeate the plastic bag (high density polyethylene) which contains the flameless heater. Foil-faced polyethylene can be used to make this outer bag moisture proof and thereby greatly improve the shelf life of the device. Alternatively, if the first method were used for construction and no holes were put in the rigid back cover, then a foil cover on top of the porous top cover would be used for moisture protection and manually removed prior to adding the water and meal pack into the bag.

The current Mg—Fe corrosion reaction is highly energetic but also results in the production of a considerable quantity of hydrogen. Its use also complicates automated packaging techniques because of fire and safety hazards. There are numerous reactions with water which are less energetic. Since the mass of the heater material is not significant (it is only 22 grams), there are several alternative reactions which can also work quite well in this MRE flameless heater application. Examples of alternate materials that could be used for the heat source include:

1. Calcium oxide plus water to yield calcium hydroxide.
2. Anhydrous calcium chloride plus water to yield hydrated calcium chloride.
3. Magnesium oxide plus water to yield magnesium hydroxide.
4. Zeolite molecular sieves with water.
5. Silica gel with water.

The foregoing represent reactions of anhydrides with water, hydrate formation with water, and adsorption reactions of water with adsorbents. The examples given above are examples where all of the components are safe to use in contact with food. Generally, any exothermic reaction with water that uses and produces non-toxic materials can be used for this reaction.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A heater pad adapted to be placed in a bag and contacted by water for heating food and the like, comprising:
   a rigid member with a plurality of cavities;
   water-activated, exothermic-chemical heater material in the cavities; and
   a flexible, porous wettable cover joined with one side of the rigid member.

2. The heater pad according to claim 1 wherein the rigid member is provided with holes sized for exhaust of gases while avoiding water bridging.

3. The heater pad according to claim 1, wherein the porous wettable cover is joined to the rigid member by one of thermal and adhesive bonding.

4. The heater pad according to claim 1, wherein the porous wettable cover is made from one of nonwoven polypropylene, melt-blown polypropylene, spun-blown polypropylene, cellulose-fiber, tea paper and nonwoven polyethylene.

5. The heater pad according to claim 1, wherein the rigid member is made from one of polystyrene, polypropylene, and polyethylene.

6. The heater pad according to claim 1, wherein the cavities are cup-like depressions in the rigid member.

7. The heater pad according to claim 6, wherein the rigid member is made from one of polystyrene, polypropylene, and polyethylene.

8. The heater pad according to claim 7, wherein the porous wettable cover is made from at least one of cellulose material and polymeric material.

9. The heater pad according to claim 8, wherein the porous wettable cover is joined to the rigid member by one of thermal and adhesive bonding.

10. The heater pad according to claim 9, wherein the rigid member is provided with holes sized for exhaust of gases while avoiding water bridging.

11. A heater pad adapted to be placed in a bag and contacted by water for heating food and the like, comprising:
- a porous, heat-sealable package configured in pouches;
- water-activated, exothermic-chemical heater material in the pouches; and
- a protective perforated cover arranged on each side of the package.

12. The heater pad according to claim 11, wherein the package is wettable on at least one side thereof.

13. The heater pad according to claim 12, wherein the cover is bonded to edges of the package by one of thermal and adhesive bonding 14. The heater pad according to claim 13, wherein the cover is made from one of cardboard and polymeric material.

15. The heater pad according to claim 13, wherein the package is made from at least one of cellulose material and polymeric material.

16. The heater pad according to claim 15, wherein the package material is non-woven polypropylene, melt-blown polypropylene, spun-blown polypropylene, cellulose-fiber, tea paper or non-woven polyethylene.

17. The heater pad according to claim 1, wherein the heater material comprises a supercorroding Mg—Fe alloy powder, a salt and one of an acid anhydride and free acid.

18. The heater pad according to claim 17, wherein the heater pad is arranged in an outer pouch, the one of an acid anhydride and free acid is applied to one of the outer of the pad and the inside of said outer pouch.

19. The heater pad according to claim 1, wherein the pad comprises flame-retardant materials.

20. The heater pad according to claim 19, wherein the heater material comprises a supercorroding Mg—Fe alloy powder, a salt and one of an acid anhydride and free acid.

21. The heater pad according to claim 20, wherein the heater pad is arranged in an outer pouch, the one of an acid anhydride and free acid is applied to one of the outer of the pad and inside of said outer pouch.

22. A method for making a heater pad adapted to be placed in a bag and contacted with water for heating food and the like, comprising the steps of:
- loosely placing unsintered water-activated, exothermic-chemical heater material in cavities of a rigid member so as to maintain substantially uniform distribution of the material over a desired surface area of the member; and
- joining a cover over at least one face of the member.

23. The method according to claim 22, wherein the cover is a flexible porous, wettable material.

24. The method according to claim 22, wherein the step of joining comprises bonding with one of thermal and adhesive bonds.

25. The method according to claim 22, wherein the cavities are cup-shaped.

26. The method according to claim 25, wherein the cavities are provided with holes sized to permit escape of gases while preventing water bridging.

27. The method according to claim 22, wherein the step of loosely placing includes auger filling.

28. The method according to claim 22, wherein the step of loosely placing includes dropping the material along a mid-section of the rigid member and scraping off excess amounts of the material.

29. A method for making a heater pad adapted to be placed in a bag and contacted with water for heating food and the like, comprising the steps of:
- loosely placing unsintered, water-activated exothermic-chemical material in pouches formed in a porous heat sealable package; and
- forming a protective perforated cover around each side of the package.

30. The heater pad according to claim 1, wherein the heater material comprises an Mg—Fe alloy powder and an acid hydride for controlling a heat generation rate by controlling a rate of hydrolysis of the acid anhydride upon contact of the pad with water.

31. A heater pad adapted to be placed in a bag and contacted by water for heating food and the like, comprising:
- a rigid member with a plurality of through cavities;
- water-activated, exothermic-chemical heater material in the through-cavities; and
- a flexible, porous wettable cover joined with one side of the rigid member.

32. The method according to claim 24, wherein the step of loosely placing the material in the rigid member includes first joining a cover over a bottom face of the rigid member, the cavities being through cavities.

33. The method according to claim 32, including placing a cover on a top face of said rigid member and wherein one of the covers is wettable and the other cover is one of wettable and non-wettable.

34. The heater pad according to claim 31, wherein a second cover is joined with another side of the rigid member.

* * * * *